US012692820B1

(12) United States Patent
Sudhakaran

(10) Patent No.: US 12,692,820 B1
(45) Date of Patent: Jul. 28, 2026

(54) DETECTION AND IDENTIFICATION OF FUEL INJECTOR FAILURE MODES

(71) Applicant: Cummins Inc., Columbus, IN (US)

(72) Inventor: Nandagopal Methil Sudhakaran, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 19/041,248

(22) Filed: Jan. 30, 2025

(51) Int. Cl.
*F02D 41/22* (2006.01)

(52) U.S. Cl.
CPC ........ *F02D 41/22* (2013.01); *F02D 2041/224* (2013.01); *F02D 2200/0602* (2013.01)

(58) Field of Classification Search
CPC ............... F02D 41/22; F02D 2041/224; F02D 2200/0602
See application file for complete search history.

(56) References Cited

U.S. PATENT DOCUMENTS

| | | | | |
|---|---|---|---|---|
| 6,481,427 | B1 | 11/2002 | Javaherian | |
| 6,546,912 | B2 * | 4/2003 | Tuken | F02D 41/2451 123/436 |
| 6,920,862 | B2 | 7/2005 | Pott et al. | |
| 7,152,594 | B2 * | 12/2006 | Anilovich | F02D 41/1495 123/690 |
| 7,240,479 | B1 * | 7/2007 | Fujimoto | F02D 41/1495 60/285 |
| 7,802,563 | B2 | 9/2010 | Behr et al. | |
| 7,900,615 | B2 | 3/2011 | Wang et al. | |
| 9,032,788 | B2 | 5/2015 | Methil-Sudhakaran et al. | |
| 9,689,342 | B2 * | 6/2017 | Ranga | F02B 3/12 |
| 11,346,297 | B1 * | 5/2022 | Pursifull | F02D 41/3809 |
| 2018/0087460 | A1 * | 3/2018 | Pathan | F02D 41/1498 |
| 2018/0328306 | A1 * | 11/2018 | Pursifull | F02D 41/3094 |
| 2022/0412283 | A1 * | 12/2022 | Pursifull | F02D 41/221 |

FOREIGN PATENT DOCUMENTS

| | | | | |
|---|---|---|---|---|
| CN | 104879257 B * | 1/2019 | F02D 41/3845 |
| DE | 60105917 T2 * | 10/2005 | F01N 3/20 |
| DE | 102006061894 A1 * | 7/2008 | F02D 41/221 |
| DE | 102008002085 A1 * | 12/2008 | F02D 41/221 |
| DE | 102021211924 A1 * | 5/2022 | F02D 41/22 |
| WO | WO-0183969 A2 * | 11/2001 | F02D 41/3809 |
| WO | WO-2020051052 A1 * | 3/2020 | F02D 41/221 |

* cited by examiner

*Primary Examiner* — Hung Q Nguyen
(74) *Attorney, Agent, or Firm* — Taft Stettinius & Hollister LLP

(57) ABSTRACT

A fuel system includes including a fuel rail configured to receive fuel from a fuel supply and to supply fuel to a plurality of fuel injectors. A pressure sensor is operatively coupled with and configured to sense pressure of fuel in the fuel rail. An exhaust oxygen sensor operatively coupled with and configured to sense oxygen content of exhaust output by the engine. An electronic control system is configured to receive a fuel pressure signal from the pressure sensor, detect a predetermined frequency of the pressure signal, receive an exhaust oxygen signal from the exhaust oxygen sensor, and in response to an output of the resonating filter and the exhaust oxygen signal, diagnose one of an under-fueling failure mode and an over-fueling failure mode of a diagnosed injector of the plurality of injectors.

20 Claims, 7 Drawing Sheets

400

| Row | Injector 1 | Injector 2 | Injector 3 | Injector 4 | Injector 5 | Injector 6 | Frequency | Amplitude |
|---|---|---|---|---|---|---|---|---|
| 1 | X | O | O | O | O | O | H1 | 1 |
| 2 | O | O | O | X | O | O | H1 | 1 |
| 3 | X | X | O | O | O | O | H1 | 2 |
| 4 | X | X | X | O | O | O | H1 | 3 |
| 5 | X | X | X | X | O | O | H1 | 2 |
| 6 | X | X | X | X | X | O | H1 | 1 |

Fig. 5

500

| Row | Injector 1 | Injector 2 | Injector 3 | Injector 4 | Injector 5 | Injector 6 | Frequency | Amplitude |
|---|---|---|---|---|---|---|---|---|
| 1 | X | O | X | O | O | O | H3 | 1 |
| 2 | O | X | O | X | O | O | H3 | 1 |
| 3 | O | O | X | O | X | O | H3 | 1 |
| 4 | O | O | O | X | O | X | H3 | 1 |
| 5 | X | O | O | O | X | O | H3 | 1 |
| 6 | X | O | X | O | X | O | H3 | 2 |
| 7 | O | X | O | X | O | X | H3 | 2 |

Fig. 6

600

| Row | Injector 1 | Injector 2 | Injector 3 | Injector 4 | Injector 5 | Injector 6 | Frequency | Amplitude |
|---|---|---|---|---|---|---|---|---|
| 1 | X | O | O | X | O | O | H2 | 1 |
| 2 | O | X | O | O | X | O | H2 | 1 |
| 3 | O | O | X | O | O | X | H2 | 1 |

Fig. 7

DETECTION AND IDENTIFICATION OF FUEL INJECTOR FAILURE MODES

TECHNICAL FIELD

The present disclosure relates to detection and identification of fuel injector failure modes and more particularly, but not exclusively, to detection of injector or injection imbalance, under-fueling, and/or over-fueling using a combination of a digital resonating filter and an O2 sensor, as well as to apparatuses, methods, systems, and techniques relating to the foregoing.

BACKGROUND

A number of proposals for detecting fuel injector failure have been made. Existing proposals suffer from a number of disadvantages and shortcomings including those respecting accuracy, complexity, precision, reliability, specificity, and speed, among others. There remains a significant need for the unique apparatuses, methods, systems, and techniques of the present disclosure.

DISCLOSURE OF EXAMPLE EMBODIMENTS

For the purposes of clearly, concisely and exactly describing example embodiments of the present disclosure, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

Example embodiments include unique apparatuses, methods, systems, and techniques to detect misfire events in an internal combustion engine. Further embodiments, forms, objects, features, advantages, aspects, and benefits shall become apparent from the following description and drawings.

BRIEF DESCRIPTION OF THE FIGURES

FIGS. 5-7 are tables illustrating certain aspects of example injector failure events.

DETAILED DESCRIPTION OF EXAMPLE EMBODIMENTS

Figure 1:
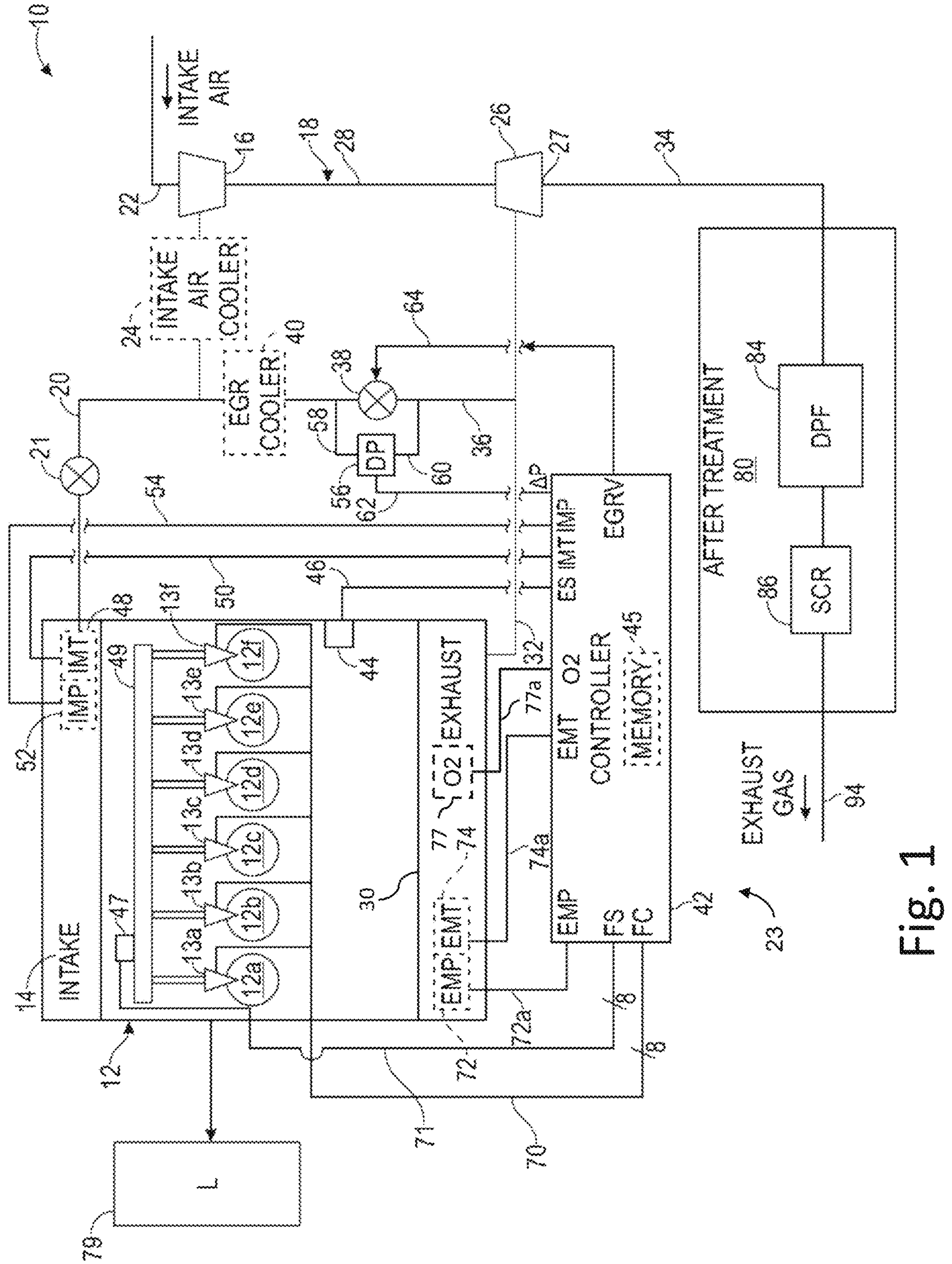
FIG. 1 is a schematic diagram illustrating certain aspects of an example engine system.

With reference to FIG. 1, there are illustrated certain aspects of an example powertrain system 10 (also referred to as system 10). In the illustrated embodiment, system 10 includes an internal combustion engine 12 including an intake manifold 14 which is fluidly coupled to an outlet of a compressor 16 of a turbocharger 18 via an intake conduit 20. Compressor 16 includes a compressor inlet coupled to an intake conduit 22 for receiving fresh air therefrom. The compressor 16 is mechanically coupled to a turbine 26 via a drive shaft 28. The turbine 26 includes a turbine inlet fluidly coupled to an exhaust manifold 30 of engine 12 via an exhaust conduit 32. System 10 may include an intake air cooler 24 disposed in line with intake conduit 20 between compressor 16 and intake manifold 14. System 10 may also include an intake air throttle (IAT) 21. In other embodiments, the engine 10 may be of a naturally aspirated type and may omit turbocharger 18. In further embodiments, the engine 10 may be of a supercharged type and one or more engine-driven compressors may be provided in lieu of exhaust-driven turbocharger 18.

In the illustrated embodiment the engine 12 is a reciprocating piston, direct injection, compression ignition engine configured to combust diesel fuel. It shall nevertheless be appreciated that the engine 12 may also be provided in other forms including one or more of port injection, spark ignition, and configured to combust other types of fuel such as natural gas or other gaseous fuel or gasoline. Furthermore, engine 12 may be configured with stoichiometric combustion (e.g., in the case of a natural gas, gasoline, or hydrogen fueled engine) or with lean combustion (e.g., in the case of lean combustion diesel engine). It shall be further appreciated that the teachings of the present disclosure may be implemented in connection with essentially any reciprocating piston engine.

The engine 12 includes a plurality of cylinders **12*a*-12*f* containing respective reciprocating pistons each connected to a crankshaft by a corresponding connecting rod (not shown) to reciprocally move within the respective cylinder 12*a*-12*f* in a standard manner for four-stroke engine operation. Each cylinder 12*a*-12*f* includes a combustion chamber with appropriate intake and exhaust valves (not shown) and fuel injectors 13*a*-13*f*. Fuel injectors 13*a*-13*f* are configured to operate in response to signals from electronic controls such as those further described herein. Fuel injectors 13*a*-13*f*** receive fuel from a fuel source (not shown) in fluid communication therewith.

System 10 includes an EGR valve 38 disposed in-line with an EGR conduit 36 fluidly coupled at one end to intake conduit 20 and at an opposite end to exhaust conduit 32. An EGR cooler 40 may optionally be disposed in-line with EGR conduit 36 between EGR valve 38 and intake conduit 20 as shown in phantom in FIG. 1.

System 10 includes an electronic control system (ECS) 23. In the illustrated form the ECS 23 includes a controller 42 which may be provided as an electronic control unit (ECU) or an electronic control module (ECM). ECS 23 may further include additional controllers which may be provided as additional ECU or ECM units in communication with one another over a communication network such as a controller area network (CAN). In some embodiments, one or more parts or components of ECS 23, for example, the controller 42, may be provided in the form of an electronic computing system of a diagnostic apparatus configured to be operatively coupled with an engine. In some such embodiments, the controller 42 or other electronic computing system components may receive information such as one or more additional signal(s) permitting the controller 42 or other electronic computing system components to evaluate or determine a cylinder firing sequence associated with an engine being diagnosed or otherwise under evaluation. Such information may comprise, for example, a signal from a crank "reference" marking sensor indicating an angle (e.g., an angle corresponding to top-dead-center (TDC), bottom-dead-center (BDC), or another angle for a given cylinder). Provision of such information to the controller 42 or other electronic computing system components may include translation or conversion of one or more signals to accomplish or facilitate the foregoing acts and capabilities.

The controller 42 is generally operable to control and manage operational aspects of engine 12. The controller 42 includes memory 45 as well as a number of inputs and outputs for interfacing with various sensors and systems coupled to engine 12. The controller 42 can be an electronic circuit comprised of one or more components, including digital circuitry, analog circuitry, or both. The controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or other arrangements. The controller 42 can include signal conditioners, signal format converters (such as analog-to-digital and digital-to-analog converters), limiters, clamps, filters, and the like as needed to perform various control and regulation operations described herein.

The controller 42 may be configured for regulation and control of the overall operation of the engine 12. Alternatively, controller 42 may be configured for regulation and control of a set of controlled aspects of engine 12. The controller 42 is configured to store controller executable instructions and to execute these instructions to provide for regulation and control of the engine 12. These controller executable instructions may be configured in accordance with one or more of the control processes described herein as well as other control processes.

The controller 42 is configured to receive as input or otherwise access a number of inputs for receiving signals from various sensors or sensing systems associated with system 10. For example, system 10 includes an engine speed sensor 44 electrically connected to an engine speed input, ES, of the controller 42 via signal path 46. Engine speed sensor 44 is operable to sense rotational speed of the engine 12 and produce an engine speed signal on signal path 46 indicative of engine rotational speed. Engine speed sensor 44 may be provided as a crankshaft speed sensor. In one embodiment, engine speed sensor 44 is a Hall effect sensor operable to determine engine speed. Alternatively, engine speed sensor 44 may be any other known sensor operable as just described including, but not limited to, a variable reluctance sensor or the like. System 10 further includes a fuel system sensor 47 electrically connected to fuel system input, FS, of the controller 42 via signal path 71. In the illustrated embodiment, pressure sensor 47 is in fluid communication with fuel rail 49 and is configured to sense a pressure associated with a fuel rail 49. In other embodiments, pressure sensor 47 my be provided in other locations and configurations. Fuel rail 49 is configured to supply fuel to fuel injector **13*a*-13*f***.

System 10 may include an intake manifold temperature sensor 48 disposed in fluid communication with the intake manifold 14 of engine 12, and electrically connected to an intake manifold temperature input (IMT) of the controller 42 via signal path 50. Intake manifold temperature sensor 48 is operable to provide a temperature signal on signal path 50 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 38.

System 10 may also include an intake manifold pressure sensor 52 disposed in fluid communication with intake manifold 14 and electrically connected to an intake manifold pressure input (IMP) of the controller 42 via signal path 54. Alternatively, pressure sensor 52 may be disposed in fluid communication with intake conduit 20. In any case, pressure sensor 52 is operable to produce a pressure signal on signal path 54 indicative of air pressure within intake conduit 20 and intake manifold 14.

System 10 may also include an oxygen (O2) sensor 77 disposed in fluid communication with exhaust output by engine and electrically connected to an O2 input of the controller 42 via signal path **77*a*. O2 sensor 77 is configured to provide an output indicative of an amount or concentration of oxygen present in the exhaust output by the engine. O2 sensor may be configured and provided in a number of forms including, for example, a universal exhaust gas oxygen sensor (UEGO), a lambda sensor, or various other forms as will occur to one of skill in the art with the benefit and insight of the present disclosure. In the illustrated example, O2 sensor 77 is located at or proximate exhaust manifold 30. In other embodiments O2 sensor 77 may be provided at other locations including, for example, intermediate exhaust manifold 30 and turbine 26, or downstream of turbine outlet 27**.

System 10 may also include an exhaust manifold pressure sensor 72 disposed in fluid communication with exhaust manifold 30 and electrically connected to an exhaust manifold pressure input (EMP) of the controller 42 via signal path 72 *a*. In other forms, pressure sensor 72 may be disposed in the fluid communication with exhaust conduit 32. Pressure sensor 72 is operable to produce a pressure signal on signal path 72 indicative of gas pressure within exhaust conduit 32 and exhaust manifold 30. In other forms, one or both of exhaust manifold pressure sensor 72 and exhaust manifold temperature sensor 74 may be absent from system 10, and exhaust pressure and temperature may be calculated or estimated from other parameters. For example, in forms where the exhaust manifold pressure sensor is absent exhaust manifold pressure may be calculated or estimated using a number of techniques or models such as via the speed density equation or by other calculations or estimations.

System 10 may include a differential pressure sensor, or DP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, DP sensor 56 may be coupled across another flow restriction mechanism disposed in-line with EGR conduit 36. In either case, the DP sensor 56 may be of known construction and is electrically connected to a DP input of the controller 42 via signal path 62. DP sensor 62 is operable to provide a differential pressure signal on signal path 62 indicative of the pressure differential across EGR valve 38 or other flow restriction mechanism disposed in-line with EGR conduit 36. Nonetheless, it should be recognized that in other embodiments EGR valve 38, DP sensor 56, and associated conduits, coolers, and the like, may be absent.

The controller 42 is also configured to provide a number of outputs for controlling one or more engine functions associated with system 10. For example, EGR valve 38 is electrically connected to an EGR valve output (EGRV) of controller 42 via signal path 64. The controller 42 is operable, as is known in the art, to produce an EGR valve control signal on signal path 64 to correspondingly control the position of EGR valve 38 relative to a reference position in a known manner. The controller 42 is accordingly operable to control EGR valve 38 to selectively provide a flow of recirculated exhaust gas from exhaust manifold 30 to intake manifold 14. Accordingly, while the composition of gas flowing along pathway 33 changes from (a) compressed air, (b) to an air/fuel charge, and then (c) to exhaust-when EGR valve 38 is closed-such composition may also include various amounts of recirculated exhaust gas when EGR valve 38 is open. In certain embodiments, the controller 42 may also include one or more outputs for controlling operation of a turbocharger mechanism such as a wastegate for turbocharger 18 (if present) a variable geometry actuator (if present).

The controller 42 is further configured to provide a plurality of fueling command outputs for controlling operation of each fuel injector 13*a*-13*f* or to another number of fuel injectors where present in other embodiments and forms of system 10. The signal paths for outputs FC are also collectively designated by reference numeral 70 in FIG. 1; however, it should be understood that the timing of fuel injected by each injector 13*a*-13*f* can be independently controlled with controller 42. In addition to the timing of fuel injection, the controller 42 can also regulate the amount of fuel injected. Typically, the fuel amount varies with the number and duration of injector-activating pulses provided to injectors 13*a*-13*f*.

The system 10 may also include an aftertreatment system 80 providing aftertreatment of exhaust gases before discharge through a conduit 94. During engine operation, exhaust gas flows from turbine outlet 27 through exhaust conduit 34 in fluid communication therewith. Conduit 34 is also in fluid communication with aftertreatment system 80 which receives the exhaust gas from turbine 26 for aftertreatment. Aftertreatment system 80 can include a number of catalysts configured to chemically convert and/or remove undesirable constituents from the exhaust stream before discharge into the environment. In the illustrated form, aftertreatment system 80 includes a diesel particulate filter (DPF) 84 configured to reduce emissions of particulates. The illustrated form of aftertreatment system 80 also includes a selective catalytic reduction (SCR) catalyst 86 configured to catalyze the reduction of oxides of nitrogen (NOx) in conjunction with a reducing agent such as diesel exhaust fluid (DEF) which is introduced into the exhaust stream by a doser or injector (not shown) typically upstream of the SCR catalyst 86. In other embodiments, aftertreatment system 80 may include additional or alternative catalysts including, for example, oxidation catalysts and ammonia slip catalysts, and other catalysts as would occur to one of skill in the art with the benefit of the present disclosure.

For nominal operation, the temperature of one or more portions of aftertreatment system 80 may need to achieve certain temperature conditions. For example, the SCR catalyst 84 may need to achieve a minimum temperature in order to operate as intended or desired. Additionally, for certain regeneration modes, even higher temperatures need to be reached from time-to-time. For example, the DPF 84 may require elevated temperature for periodic regeneration to eliminated accumulated particulate matter.

System 10 is configured to drive a load 79. In some embodiments, system 10 may be configured to propel a vehicle and the load L may be a propulsion load imposed on a driveline operatively coupled with system 10 including a number of load components such as aerodynamic resistance, rolling resistance, and grade/gravitational resistance to name several examples. The driveline operatively coupled with system 10 may include, for example, a transmission, a drive shaft, a differential, and drive wheels. In some embodiments, the load 79 may be a generator, and system 10 may be configured as a generator set. In other embodiments, load L may comprise a pump, compressor, or another type of load as will occur to one of skill in the art with the benefit of the present disclosure.

Figure 2:
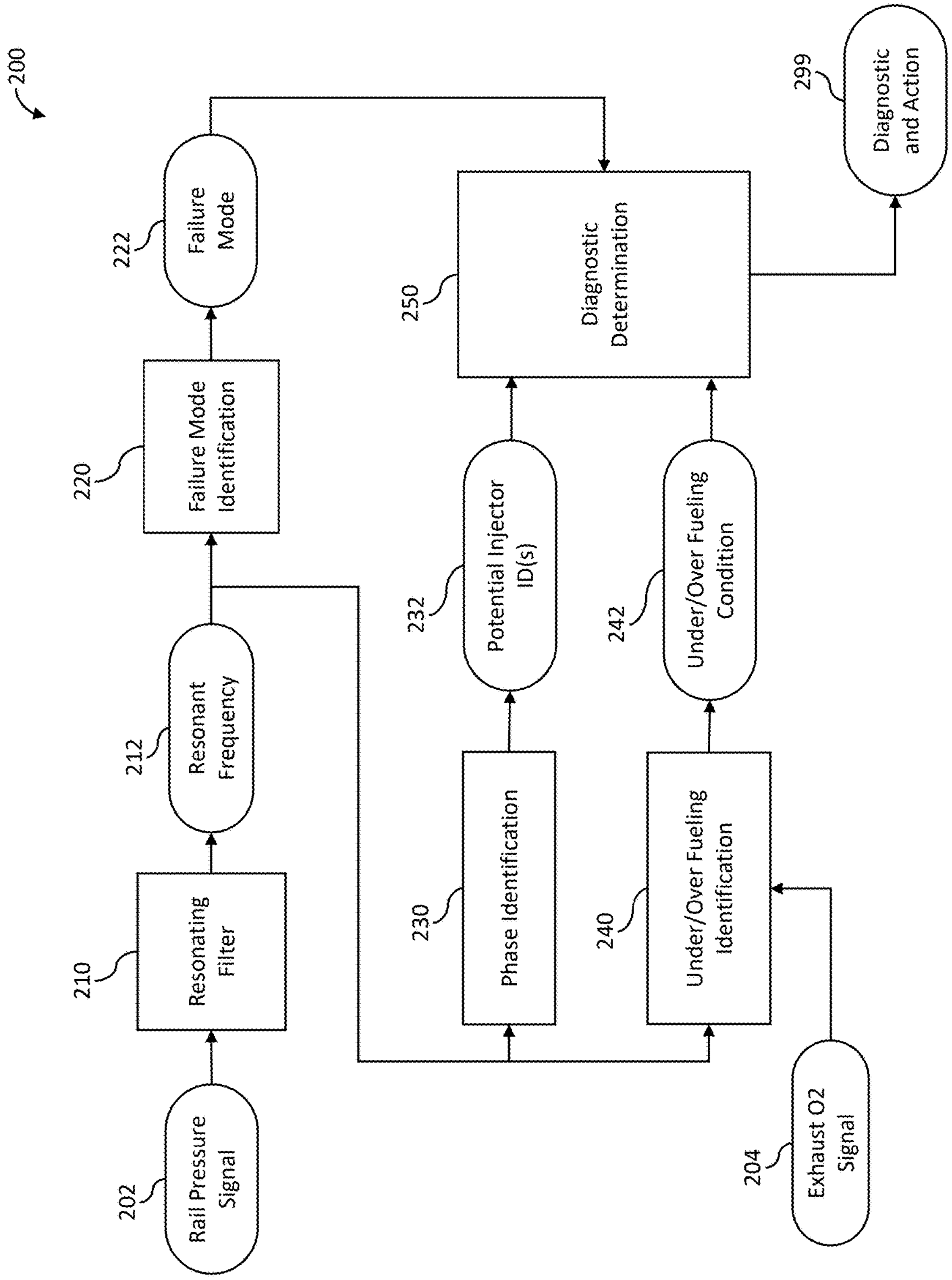
FIG. 2 is a schematic diagram illustrating certain aspects of example controls.

With reference to FIG. 2, there are illustrated controls 200 which may be implemented in and operated by one or more components of an electronic control system such as controller 42 and/or other components of ECS 23 or another electronic control system. Furthermore, controls 200 may be implemented in circuitry such as circuitry of one or more microcontrollers, microprocessors or other types of integrated circuits, for example, one or more non-transitory memory media configured to store instructions and one or more processors configured to execute the instructions. Controls 200 is further configured to detect, identify, and/or diagnose failure modes of one or more fuel injectors of an internal combustion engine, such as fuel injectors 13*a*-13*f* or other fuel injectors. It shall be appreciated that injector failures and injector failure modes encompass a variety of conditions deleteriously impacting indented or healthy injector operation, up to an including complete failure, for example, injector tip fouling, injector needle sticking, misalignment or misseating of injector needles, injector seal failures, and degradation or failure of an injector solenoid or other electromechanical or electrical injector components, among others.

Controls 200 include resonating filter 210 which is configured to receive a rail pressure signal 202 which may be received from pressure sensor 47 or another sensor configured to provide output indicative of fuel pressure of a fuel rail. Resonating filter 210 is configured and provided as a digital resonating filter (also sometimes referred to as a digital resonant filter or a digital resonator) configured to output resonant frequency parameter 212 in response to a particular signal frequency or frequency range that may be present in rail pressure signal 202. A particular signal frequency or frequency range may be determined based on empirical data for a plurality of fuel injector failure modes, statistical regression or other statistical correlation, physics-based models for a plurality of fuel injector failure modes, parametric models for a plurality of fuel injector failure modes, other techniques as will occur to one of skill in the art with the benefit and insight of the present disclosure, and/or combinations of the foregoing examples.

As further described below in connection with FIGS. 5-7, a particular signal frequency or frequency range may be utilized to identify some information about the number of injectors experiencing failure and the spacing between those injectors, but is insufficient to identify and characterize failure modes of particular fuel injectors. Likewise, phase information may be utilized to identify pairs of injectors potentially experience failure, but is insufficient (alone or in combination with frequency information) to identify and characterize failure modes of particular fuel injectors. For example, such information is not sufficient to reliably distinguish between an over fueling condition of a given injector and an under fueling condition of an adjacent injector following or preceding the given injector in firing order.

During operation of controls 200, resonant frequency parameter 212 may be provided to failure mode identification circuitry 220 (also referred to herein as circuitry 220), phase identification circuitry 230 (also referred to herein as circuitry 230), and under/over fueling identification circuitry 240 (also referred to herein as circuitry 240).

Circuitry 220 is configured to identify presence or absence of a particular fuel injector failure mode in response to resonant frequency parameter 212. In some embodiments, circuitry 220 is configured to determine an average of an absolute value (e.g., by determining an absolute value and determining an average of that absolute value) of resonant frequency parameter 212, evaluate the determined average relative to one or more predetermined criteria such as one or more predetermined thresholds, and output failure mode parameter 222 in response to satisfaction of the one or more predetermined criteria such as one or more predetermined thresholds being met or exceeded. Circuitry 220 may be configured to determine an average of an absolute value of resonant frequency parameter 212 in a number of manners, for example, by calculating or computing an average or by using other information, such as area under curve information, as a proxy for the average of an absolute value of resonant frequency parameter 212. It shall be further appreciated that various other techniques may be utilized to evaluate or judge resonant frequency parameter 212 as will occur to one of skill in the art with the benefit and insight of the present disclosure. Failure mode parameter 222 may be configured to indicate presence or absence of a particular fuel injector failure mode, for example, using a logical true and a logical false value, respectively and such value or other indication may be provided to diagnostic determination circuitry 250 (also referred to herein as circuitry 250).

In the illustrated example, circuitry 230 is configured to identify a particular injector of a plurality of injectors, for example, a particular one of injectors 13*a*-13*f*, as being associated with resonant frequency parameter 212 and, potentially, as experiencing a failure mode corresponding to failure mode parameter 222. In some embodiments, circuitry 230 is configured to evaluate a phase of resonant frequency parameter 212, evaluate the phase relative to one or more predetermined criteria such as injector firing order, injector firing time, crank angle, or other information relating to the order of operation of the plurality of injectors, and output potential injector IDs parameter 232 in response to satisfaction of the one or more predetermined criteria. Potential injector IDs parameter 232 may indicate a pair of adjacent injectors potentially experiencing failure. It shall be appreciated that various other techniques may be utilized to evaluate or judge operation of a particular injector in response to resonant frequency parameter 212 as will occur to one of skill in the art with the benefit and insight of the present disclosure. Injector ID parameter 232 may be configured to indicate a particular injector of the plurality of injectors as being associated with resonant frequency parameter 212 and, potentially, as experiencing failure mode parameter 222. Injector ID parameter 232 may be provided to circuitry 250.

In the illustrated example, circuitry 240 is configured to identify and distinguish between an under-fueling condition and an over-fueling condition associated with resonant frequency parameter 212 and failure mode parameter 222. In addition to resonant frequency parameter 212, circuitry 240 is configured to receive exhaust oxygen signal 204 which may be received from O2 sensor 77, or another sensor configured to provide output indicative of oxygen content of exhaust.

Circuitry 240 may be configured to evaluate exhaust oxygen signal 204 relative to a first predetermined criterion. The first predetermined criterion may comprise the exhaust oxygen signal being below a first predetermined threshold which is indicative of an over-fueling malfunction resulting in a decreased oxygen content of exhaust gas relative to the concentration resulting from an intended combustion mode. The intended combustion mode may comprise stoichiometric combustion or lean combustion.

Circuitry 240 may be configured to evaluate exhaust oxygen signal 204 relative to a second predetermined criterion. The second predetermined criterion may comprise the exhaust oxygen signal being above a second predetermined threshold which is indicative of an under-fueling malfunction resulting in an increased oxygen content of exhaust gas relative to the concentration resulting from an intended combustion mode. The intended combustion mode may comprise stoichiometric combustion or lean combustion.

Circuitry 240 is configured to output under/over fueling condition parameter 242 in response to the aforementioned evaluations. Under/over fueling condition parameter 242 may be configured and output with a first value in response to circuitry 240 identifying an under-fueling condition and may be configured and output with a second value in response to circuitry 240 identifying an over-fueling condition. In some embodiments, under/over fueling condition parameter 242 may be configured and output with additional values or information such as a degree of under-fueling or over-fueling. Such values or information may be provided by circuitry 240 evaluating a difference between the exhaust oxygen signal and one of the first predetermined threshold and the second predetermined threshold. Under/over fueling condition parameter 242 may be provided to circuitry 250.

Circuitry 250 is configured to diagnose an injector failure condition (e.g., an injector malfunction, misoperation, degradation or, other failure condition) in response to failure mode parameter 222, injector ID parameter 232, and over/under fueling parameter 242. In response to the foregoing parameters, circuitry 250 may diagnostic and action parameter 299 which may be configured with information indicating a particular injector failure condition for a particular injector, such as on-board diagnostic (OBD) information. Diagnostic and action parameter 299 may be also configured with information indicating a magnitude or degree of under-fueling or over-fueling or other magnitude or degree of injector failure. Diagnostic and action parameter 299 may further include information indicating one or more actions to be performed in response to a particular injector failure condition for a particular injector. Such actions may include, for example, activating a malfunction indicator light (MIL), providing other operator perceptible output alerting an operator the error condition, automatedly scheduling service via a telematics system or other communication system, and automatedly providing diagnostic information to a remote computing system via a telematics system or other communication system.

Figure 3:
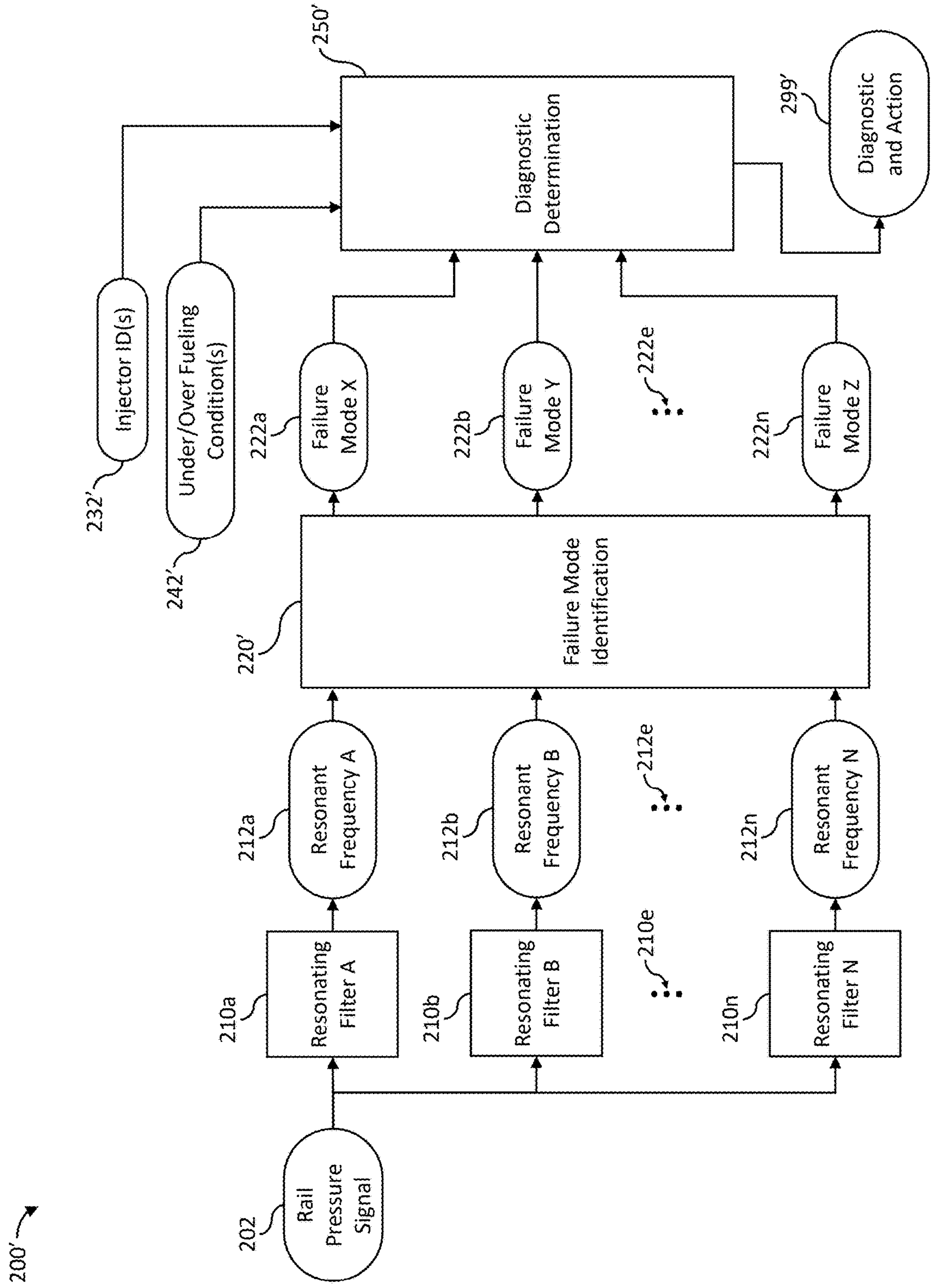
FIG. 3 is a schematic diagram illustrating certain aspects of example controls.

It shall be appreciated that some forms of controls 200 may utilize a plurality of resonating filters to identify and distinguish among a plurality of different fuel injector failure modes. For example, with reference to FIG. 3, there are illustrated controls 200' which include a number of the same structural and functional features described in connection with controls 200 as indicated by like reference numerals as well as additional structural and functional features.

Controls 200' may be implemented in and operated by one or more components of an electronic control system such as controller 42 and/or other components of ECS 23 or another electronic control system. Furthermore, controls 200' may be implemented in circuitry such as circuitry of one or more microcontrollers, microprocessors or other types of integrated circuits, for example, one or more non-transitory memory media configured to store instructions and one or more processors configured to execute the instructions. Controls 200' may be further configured to detect, identify, and/or diagnose particular one(s) of a plurality of failure modes of one or more fuel injectors of an internal combustion engine, such as fuel injectors 13*a*-13*f* or other fuel injectors.

Controls 200' include resonating filter 210*a*, resonating filter 210*b*, and resonating filter 210*n* which may be configured and provided with features and functionality generally similar to resonating filter 210. In the illustrated example, the plurality of resonating filters comprises three resonating filters. As indicated by ellipsis 210*e*, other embodiments may comprise a plurality of resonating filters comprising a different number of two or more resonating filters.

Resonating filter 210*a*, resonating filter 210*b*, and resonating filter 210*n* may be configured to resonate in response to respective different injector failure modes and output respective resonant frequency parameter 212*a*, resonant frequency parameter 212*b*, and resonant frequency parameter 212*n* in response to the presence of different frequencies or frequency ranges in rail pressure signal 202. In the illustrated example, the plurality of resonant frequency parameters comprises three resonant frequency parameters. As indicated by ellipsis 212*e*, other embodiments may comprise a plurality of resonant frequency parameter comprising a different number of two or more resonant frequency parameters.

Resonating filter 210*a* may be configured and tuned to resonate and output resonant frequency parameter 212*a* in response to a first frequency or a first frequency range associated with a first injector failure mode such as a first one of the aforementioned examples. Resonating filter 210*b* may be configured and tuned to resonate and output resonant frequency parameter 212*b* in response to a second frequency or a second frequency range associated with a second injector failure mode such as a first one of the aforementioned examples. Resonating filter 210*n* may be configured and tuned to resonate and output resonant frequency parameter 212*n* in response to a third frequency or a third frequency range associated with a third injector failure mode such as a first one of the aforementioned examples. A particular signal frequency or frequency ranges to which resonating filter 210*a*, resonating filter 210*b*, and resonating filter 210*n* respond may be determined using the same or similar techniques and procedures as those described in connection with resonating filter 210.

Failure mode identification circuitry 220' (also referred to herein as circuitry 220') is configured to receive resonant frequency parameter 212*a*, resonant frequency parameter 212*b*, and resonant frequency parameter 212*n* and to identify presence or absence of a particular one of a plurality of fuel injector failure mode in response thereto. In some embodiments, circuitry 220' is configured to determine an average of an absolute value of one or more of resonant frequency parameter 212*a*, resonant frequency parameter 212*b*, and resonant frequency parameter 212*n*, evaluate the determined average or averages relative to one or more predetermined criteria such as one or more predetermined thresholds, and output one or a plurality of failure mode parameter in response to satisfaction of the one or more respective predetermined criteria such as one or more respective predetermined thresholds being met or exceeded.

Circuitry 220' may be configured to determine an average of an absolute value of one or more of resonant frequency parameter 212*a*, resonant frequency parameter 212*b*, and/or resonant frequency parameter 212*n* in a number of manners, for example, by calculating or computing an average or by using other information, such as area under curve information, as a proxy for the average of an absolute value of resonant frequency parameter 212. It shall be further appreciated that various other techniques may be utilized to evaluate or judge resonant frequency parameter 212 as will occur to one of skill in the art with the benefit and insight of the present disclosure.

Circuitry 220' is configured to output one or more of a plurality of failure mode parameters in response to the inputs which it receives. In the illustrated example, the plurality of failure mode parameters comprises three failure mode parameters comprising failure mode parameter 222*a*, failure mode parameter 222*b*, and failure mode parameter 222*n*. As indicated by ellipsis 222*e*, other embodiments may comprise a plurality of failure mode parameters comprising a different number of two or more failure mode parameters.

Circuitry 220' may be configured to identify and output failure mode parameter 222*a*, failure mode parameter 222*b*, and failure mode parameter 222*n* in a number of manners. In some embodiments, circuitry 220' may identify and output failure mode parameter 222*a*, failure mode parameter 222*b*, and failure mode parameter 222*n* in response to a respective unique one of resonant frequency parameter 212*a*, resonant frequency parameter 212*b*, and/or resonant frequency parameter 212*n*. In other embodiments, circuitry 220' may identify and output one or more of failure mode parameter 222*a*, failure mode parameter 222*b*, and failure mode parameter 222*n* in response to a respective unique combination of two or more of resonant frequency parameter 212*a*, resonant frequency parameter 212*b*, and/or resonant frequency parameter 212*n*.

Particular relationships between resonant frequency parameters and respective corresponding failure mode parameters may be determined based on empirical data for a plurality of fuel injector failure modes, statistical regression or other statistical correlation, physics-based models for a plurality of fuel injector failure modes, parametric models for a plurality of fuel injector failure modes, other techniques as will occur to one of skill in the art with the benefit and insight of the present disclosure, and/or combinations of the foregoing examples.

Diagnostic determination circuitry 250' (also referred to herein as circuitry 250') is configured to receive failure mode parameter 222*a*, failure mode parameter 222*b*, and failure mode parameter 222*n*. Circuity 250' is also configured to receive injector ID parameter 232' and under/over fueling condition parameter 242' which may be determined and output in a manner similar to that described in connection with controls 200. It shall be appreciated that a plurality of injector ID parameter 232' may be determined for each of resonant frequency parameter 212*a*, resonant frequency parameter 212*b*, and resonant frequency parameter 212*n*, or for another plurality of resonant frequency parameters. Likewise, a plurality of under/over fueling condition parameter (s) 242' may be determined for each of resonant frequency parameter 212*a*, resonant frequency parameter 212*b*, and resonant frequency parameter 212*n*, or for another plurality of resonant frequency parameters.

Circuitry 250' is configured to diagnose one or more injector failure condition (e.g., an injector malfunction, misoperation, degradation or, other failure condition) in response to injector ID parameter 232, and over/under fueling parameter 242 one or more of failure mode parameter 222*a*, failure mode parameter 222*b*, and failure mode parameter 222*n*. In response to the foregoing parameters, circuitry 250' may diagnostic and action parameter 299' which may be configured with information indicating a particular injector failure condition for a particular injector, such as on-board diagnostic (OBD) information. Diagnostic and action parameter 299' may be also configured with information indicating a magnitude or degree of under-fueling or over-fueling or other magnitude or degree of injector failure. Diagnostic and action parameter 299' may further include information indicating one or more actions to be performed in response to a particular injector failure condition for a particular injector. Such actions may include, for example, activating a malfunction indicator light (MIL), providing other operator perceptible output alerting an operator the error condition, automatedly scheduling service via a telematics system or other communication system, and automatedly providing diagnostic information to a remote computing system via a telematics system or other communication system.

It shall be appreciated that controls 200' may provide a number of other unique features and functionalities. For example, controls 200' may be utilized to isolate and distinguish injector or injection failures from ignition failures and other failures in the event of an engine misfire. Controls 200' may additionally or alternatively be utilized to identify and distinguish between over-fueling injector failures and under-fueling injector failures. Controls 200' may additionally or alternatively be utilized to identify and distinguish between injector failures (e.g., over-fueling injector failures and under-fueling injector failures which may not register as misfire failures but can nevertheless negatively impact emissions or engine performance) and other system failures such as ignition failures.

Figure 4:
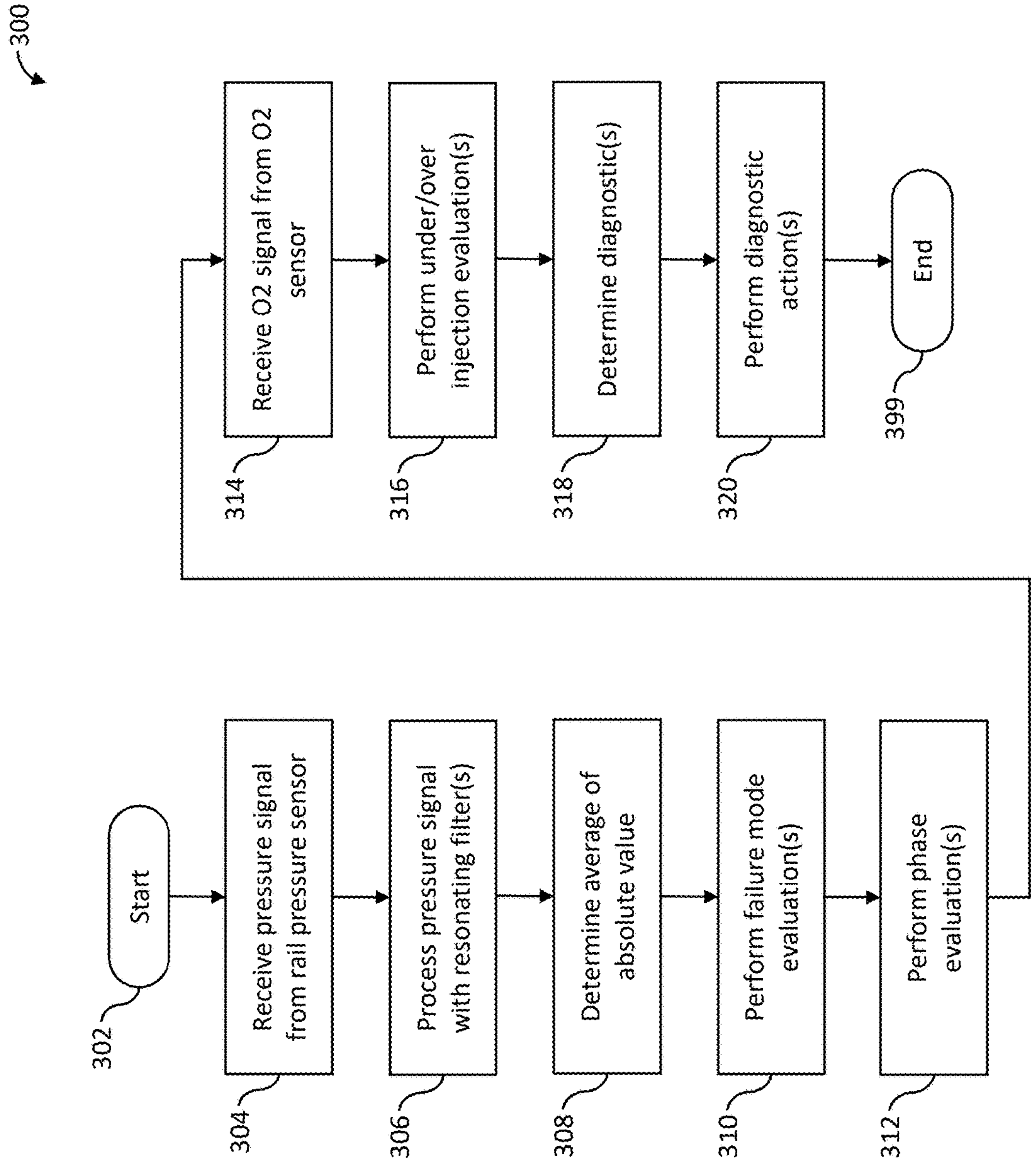
FIG. 4 is a flow diagram illustrating certain aspects of an example process.

With reference to FIG. 4, there is illustrated and example process 300 according to the present disclosure. Process 300 may be executed or performed at least in part by one or more components of an electronic control system such as controller 42 and/or other components of ECS 23 or another electronic control system, for example, using circuitry of one or more microcontrollers, microprocessors or other types of integrated circuits, for example, one or more non-transitory memory media configured to store instructions and one or more processors configured to execute the instructions.

Process 300 begins at start operation 302 and proceeds to operation 304 which receives pressure signal from rail pressure sensor. From operation 304, process 300 proceeds to operation 306 which detects one or more predetermined frequencies of the pressure signal. The one or more predetermined frequencies may comprise one or more harmonics of the pressure signal or other predetermined frequencies. In the illustrated example, operation 306 processes the received pressure signal with one or more resonating filters to provide as output one or more resonant frequency parameters in response to the presence of one or more particular frequencies or particular frequency ranges. Operation 306 may, for example, utilize the techniques described in connection with resonating filter 210, resonating filter 210*a*, resonating filter 210*b*, or resonating filter 210*n*. Operation 306 may also utilize other techniques and components to detect one or more predetermined frequencies of the pressure signal.

From operation 306, process 300 proceeds to operation 308 which determines an average of an absolute value of a resonant frequency, for example, using one or more of the techniques described herein. From operation 308, process 300 proceeds to operation 310 which performs one or more failure mode evaluations in response to the one or more resonant frequency parameters. Operation 10 may, for example, utilize the techniques described in connection with circuitry 220 or circuitry 220'.

From operation 310, process 300 proceeds to operation 312 which performs one or more phase evaluation in response to the one or more resonant frequencies. Operation 312 may, for example, utilize the techniques described in connection with circuitry 230.

From operation 312, process 300 proceeds to operation 314 which receives and oxygen signal from an oxygen sensor, for example, as described in connection with circuitry 240 and exhaust oxygen signal 204. From operation 314, process 300 proceeds to operation 316 which performs one or more under/over injection evaluations in response to the oxygen signal received from the oxygen sensor and the one or more resonant frequencies. Operation 316 may, for example, utilize the techniques described in connection with circuitry 240.

From operation 316, process 300 proceeds to operation 318 which determines one or more diagnostics. Operation 318 may, for example, utilize the techniques described in connection with circuitry 250 or circuitry 250'. From operation 318, process 300 proceeds to operation 320 which perform one or more diagnostic actions. Operation 320 may, for example, utilize the techniques described in connection with circuitry 250 or circuitry 250'. From operation 320, process 300 proceeds to end operation 399 and may thereafter be recalled or repeated.

With reference to FIGS. 5-7, there are illustrated a plurality of tables depicting various injector failure for a six-cylinder, six-injector engine system. In the illustrated tables an "O" denotes a rail pressure signal frequency response corresponding to normal injector operation and an "X" denotes a rail pressure signal frequency response corresponding an injector failure.

As illustrated in FIG. 5, table 400 illustrates a plurality of different injector failure scenarios wherein a single injector experiences injector failure. The injector failure scenarios depicted in row 1, row 2, and row 6 exhibit the same frequency response, namely a first harmonic frequency (H1), and the same amplitude (arbitrarily indicated as "1" for purposes of illustration). Thus, frequency and amplitude information are insufficient to distinguish between the injector failure scenarios of row 1, row 2, and row 3. The addition of phase information may be utilized to distinguish between these injector failure scenarios to some degree; however, adding phase information is insufficient to reliably distinguish between an under-fueling condition of one injector that pushes rail pressure high, and an over-fueling condition of another injector that fires 180 degrees out of phase with the first injector and pulls rail pressure low due to the reciprocal push-pull effects of these injectors with opposing failure modes and phases being unreliably distinguishable in these domains. For example, an under-fueling event for injector 1 in row 1 of table 400 and an over-fueling event for injector 4 in row 2 of table 400 are not reliably distinguishable based on frequency, amplitude, or phase information, but can be reliably distinguished by the techniques disclosed herein.

The injector failure scenarios of rows 3-5 exhibit similar issues. For example, it is not feasible to distinguish between the injector failure scenarios of row 3 and row 5 using rail pressure signal frequency response and amplitude alone.

Furthermore, for these scenarios adding phase information is still insufficient to reliably distinguish between an under fueling condition of one injector and an over fueling condition of an injector adjacent in firing order.

As illustrated in FIG. 6, table 500 illustrates a plurality of different injector failure scenarios wherein two injectors experiences injector failure separated by one intermediate normal injector. Frequency and amplitude information are the same for each of rows 1-5 and insufficient to distinguish between them and adding phase information is still insufficient to reliably distinguish between an under fueling condition of one injector and an over fueling condition of an injector adjacent in firing order. Furthermore, while amplitude information may be useful in distinguishing the injector failure scenarios of rows 6-7 from those of rows 1-5, distinguishing As illustrated in FIG. 7, table 600 illustrates a plurality of different injector failure scenarios wherein two injectors experiences injector failure separated by two intermediate normal injector. Frequency and amplitude information are the same for each of rows 1-3 and insufficient to distinguish between them and adding phase information is still insufficient to reliably distinguish between an under fueling condition of one injector and an over fueling condition of an injector adjacent in firing order.

In each of the different injector failure scenarios of tables 400, 500, and 600, information from an exhaust O2 sensor may be utilized to distinguish between otherwise indistinguishable injector failure scenarios by eliminating one of an under fueling and an over fueling scenario which is inconsistent with the information from the exhaust O2 sensor. It shall be further appreciated that similar distinction difficulties and exhaust O2 sensor-based solutions are applicable to systems with different numbers of injectors. As shown by this detailed description, the present disclosure contemplates multiple and various embodiments, including, without limitation, the following example embodiments.

Example embodiment 1 is a system comprising: an engine including a plurality of cylinders; a fuel system configured to supply fuel to the plurality of cylinders, the fuel system including a fuel rail configured to receive fuel from a fuel supply and to supply fuel to a plurality of fuel injectors, a pressure sensor operatively coupled with and configured to sense pressure of fuel in the fuel rail, an exhaust oxygen sensor operatively coupled with and configured to sense oxygen content of exhaust output by the engine, and an electronic control system operatively coupled with the engine, the plurality of fuel injectors, the pressure sensor, and the exhaust oxygen sensor, the electronic control system being configured to: receive a fuel pressure signal from the pressure sensor, detect a predetermined frequency of the pressure signal, receive an exhaust oxygen signal from the exhaust oxygen sensor, and in response to the predetermined frequency and the exhaust oxygen signal, diagnose one of an under-fueling failure mode and an over-fueling failure mode of a diagnosed injector of the plurality of injectors.

Example embodiment 2 includes the features of example embodiment 1, wherein the electronic control system is configured to: determine an average of an absolute value of an output of the resonating filter; diagnose the under-fueling failure mode in response to the average satisfying a predetermined criterion and the exhaust oxygen signal satisfying a first predetermined criterion; and diagnose the under-fueling failure mode in response to the average satisfying the predetermined criterion and the exhaust oxygen signal satisfying a second criterion differing from the first criterion.

Example embodiment 3 includes the features of example embodiment 2, wherein: the first predetermined criterion comprises the exhaust oxygen signal being below a first predetermined threshold, and the second predetermined criterion comprises the exhaust oxygen signal being above a second predetermined threshold.

Example embodiment 4 includes the features of example embodiment 3, wherein the first predetermined threshold and the second predetermined threshold are determined for stoichiometric fuel combustion.

Example embodiment 5 includes the features of example embodiment 1, wherein the electronic control system is configured to: process the pressure signal with a plurality of resonating filters configured to resonate in response to a plurality of different injector failure modes; and differentially diagnose one of the plurality of different injector failure modes in response to output of one or more of the plurality of resonating filters.

Example embodiment 6 includes the features of example embodiment 1, wherein the system distinguishes between an under fueling condition of a first injector and an over-fueling condition of a second injector adjacent the first injector in firing order in response to the exhaust oxygen signal.

Example embodiment 7 includes the features of example embodiment 1, wherein the electronic control system is configured to identify the diagnosed injector in response to a phase of the predetermined frequency.

Example embodiment 8 is a process comprising operating a fuel system to supply fuel to an internal combustion engine, the fuel system including a fuel rail configured to receive fuel from a fuel supply and to supply fuel to a plurality of fuel injectors, a pressure sensor operatively coupled with and configured to sense pressure of fuel in the fuel rail, an exhaust oxygen sensor, and an electronic control system operatively coupled with the engine, the plurality of fuel injectors, the pressure sensor, and the exhaust oxygen sensor; and operating the electronic control system to: receive a fuel pressure signal from the pressure sensor, process the pressure signal with a resonating filter, receive an exhaust oxygen signal from the exhaust oxygen sensor, and in response to an output of the resonating filter and the exhaust oxygen signal, diagnose one of an under-fueling failure mode and an over-fueling failure mode of an injector of the plurality of injectors.

Example embodiment 9 includes the features of example embodiment 8, comprising operating the electronic control system to: determine an average of an absolute value of an output of the resonating filter; diagnose the under-fueling failure mode in response to the average satisfying a predetermined criterion and the exhaust oxygen signal satisfying a first predetermined criterion; and diagnose the under-fueling failure mode in response to the average satisfying the predetermined criterion and the exhaust oxygen signal satisfying a second criterion differing from the first criterion.

Example embodiment 10 includes the features of example embodiment 9, wherein the first predetermined criterion comprises the exhaust oxygen signal being below a first predetermined threshold, and the second predetermined criterion comprises the exhaust oxygen signal being above a second predetermined threshold.

Example embodiment 11 includes the features of example embodiment 10, wherein the first predetermined threshold and the second predetermined threshold are determined for stoichiometric fuel combustion.

Example embodiment 12 includes the features of example embodiment 8, comprising operating the electronic control system to: process the pressure signal with a plurality of resonating filters configured to resonate in response to a plurality of different injector failure modes; and differentially diagnose one of the plurality of different injector failure modes in response to output of one or more of the plurality of resonating filters.

Example embodiment 13 includes the features of example embodiment 12, wherein the process distinguishes between an under fueling condition of a first injector and an over-fueling condition of a second injector adjacent the first injector in firing order in response to the exhaust oxygen signal.

Example embodiment 14 includes the features of example embodiment 8, comprising operating the electronic control system to identify the diagnosed injector in response to a phase of the output of the resonating filter.

Example embodiment 15 is an electronic controller apparatus comprising: a processor; and a non-transitory memory medium configured instructions executable by the processor to: receive a fuel pressure signal from a pressure sensor, process the pressure signal with a resonating filter, receive an exhaust oxygen signal from the exhaust oxygen sensor, and in response to an output of the resonating filter and the exhaust oxygen signal, diagnose one of an under-fueling failure mode and an over-fueling failure mode of an injector of a plurality of injectors.

Example embodiment 16 includes the features of example embodiment 15, wherein the non-transitory memory medium is configured with instructions executable by the processor to: determine an average of an absolute value of an output of the resonating filter; diagnose the under-fueling failure mode in response to the average satisfying a predetermined criterion and the exhaust oxygen signal satisfying a first predetermined criterion; and diagnose the under-fueling failure mode in response to the average satisfying the predetermined criterion and the exhaust oxygen signal satisfying a second criterion differing from the first criterion.

Example embodiment 17 includes the features of example embodiment 16, wherein: the first predetermined criterion comprises the exhaust oxygen signal being below a first predetermined threshold, and the second predetermined criterion comprises the exhaust oxygen signal being above a second predetermined threshold.

Example embodiment 18 includes the features of example embodiment 71, wherein the first predetermined threshold and the second predetermined threshold are determined for stoichiometric fuel combustion.

Example embodiment 19 includes the features of example embodiment 15, wherein the non-transitory memory medium is configured with instructions executable by the processor to: process the pressure signal with a plurality of resonating filters configured to resonate in response to a plurality of different injector failure modes; and differentially diagnose one of the plurality of different injector failure modes in response to output of one or more of the plurality of resonating filters.

Example embodiment 20 includes the features of example embodiment 19, wherein the electronic controller apparatus distinguishes between an under fueling condition of a first injector and an over-fueling condition of a second injector adjacent the first injector in firing order in response to the exhaust oxygen signal.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, frequency, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:

an engine including a plurality of cylinders;

a fuel system configured to supply fuel to the plurality of cylinders, the fuel system including a fuel rail configured to receive fuel from a fuel supply and to supply fuel to a plurality of fuel injectors, a pressure sensor operatively coupled with and configured to sense pressure of fuel in the fuel rail, an exhaust oxygen sensor operatively coupled with and configured to sense oxygen content of exhaust output by the engine, and and an electronic control system operatively coupled with the engine, the plurality of fuel injectors, the pressure sensor, and the exhaust oxygen sensor, the electronic control system being configured to:

receive a fuel pressure signal from the pressure sensor, detect a predetermined frequency of the pressure signal, receive an exhaust oxygen signal from the exhaust oxygen sensor, and in response to the predetermined frequency and the exhaust oxygen signal, diagnose one of an under-fueling failure mode and an over-fueling failure mode of a diagnosed injector of the plurality of injectors.

2. The system of claim 1, wherein the electronic control system is configured to:

determine an average of an absolute value of an output of a resonating filter;

diagnose the under-fueling failure mode in response to the average satisfying a predetermined criterion and the exhaust oxygen signal satisfying a first predetermined criterion; and diagnose the under-fueling failure mode in response to the average satisfying the predetermined criterion and the exhaust oxygen signal satisfying a second criterion differing from the first criterion.

3. The system of claim 2, wherein:

the first predetermined criterion comprises the exhaust oxygen signal being below a first predetermined threshold, and the second predetermined criterion comprises the exhaust oxygen signal being above a second predetermined threshold.

4. The system of claim 3, wherein the first predetermined threshold and the second predetermined threshold are determined for stoichiometric fuel combustion.

5. The system of claim 1, wherein the electronic control system is configured to:

process the pressure signal with a plurality of resonating filters configured to resonate in response to a plurality of different injector failure modes; and differentially diagnose one of the plurality of different injector failure modes in response to output of one or more of the plurality of resonating filters.

6. The system of claim 1, wherein the system distinguishes between an under fueling condition of a first injector and an over-fueling condition of a second injector adjacent the first injector in firing order in response to the exhaust oxygen signal.

7. The system of claim 1, wherein the electronic control system is configured to identify the diagnosed injector in response to a phase of the predetermined frequency.

8. A process comprising:

operating a fuel system to supply fuel to an internal combustion engine, the fuel system including a fuel rail configured to receive fuel from a fuel supply and to supply fuel to a plurality of fuel injectors, a pressure sensor operatively coupled with and configured to sense pressure of fuel in the fuel rail, an exhaust oxygen sensor, and an electronic control system operatively coupled with the engine, the plurality of fuel injectors, the pressure sensor, and the exhaust oxygen sensor; and operating the electronic control system to:

receive a fuel pressure signal from the pressure sensor, process the pressure signal with a resonating filter, receive an exhaust oxygen signal from the exhaust oxygen sensor, and in response to an output of the resonating filter and the exhaust oxygen signal, diagnose one of an under-fueling failure mode and an over-fueling failure mode of an injector of the plurality of injectors.

9. The process of claim 8, comprising operating the electronic control system to:

determine an average of an absolute value of an output of the resonating filter;

diagnose the under-fueling failure mode in response to the average satisfying a predetermined criterion and the exhaust oxygen signal satisfying a first predetermined criterion; and diagnose the under-fueling failure mode in response to the average satisfying the predetermined criterion and the exhaust oxygen signal satisfying a second criterion differing from the first criterion.

10. The process of claim 9, wherein:

the first predetermined criterion comprises the exhaust oxygen signal being below a first predetermined threshold, and the second predetermined criterion comprises the exhaust oxygen signal being above a second predetermined threshold.

11. The process of claim 10, wherein the first predetermined threshold and the second predetermined threshold are determined for stoichiometric fuel combustion.

12. The process of claim 8, comprising operating the electronic control system to:

process the pressure signal with a plurality of resonating filters configured to resonate in response to a plurality of different injector failure modes; and differentially diagnose one of the plurality of different injector failure modes in response to output of one or more of the plurality of resonating filters.

13. The process of claim 12, wherein the process distinguishes between an under fueling condition of a first injector and an over-fueling condition of a second injector adjacent the first injector in firing order in response to the exhaust oxygen signal.

14. The process of claim 8, comprising operating the electronic control system to identify the diagnosed injector in response to a phase of the output of the resonating filter.

15. An electronic controller apparatus comprising:

a processor; and a non-transitory memory medium configured instructions executable by the processor to:

receive a fuel pressure signal from a pressure sensor, process the pressure signal with a resonating filter, receive an exhaust oxygen signal from the exhaust oxygen sensor, and in response to an output of the resonating filter and the exhaust oxygen signal, diagnose one of an under-fueling failure mode and an over-fueling failure mode of an injector of a plurality of injectors.

16. The electronic controller apparatus of claim 15, wherein the non-transitory memory medium is configured with instructions executable by the processor to:

determine an average of an absolute value of an output of the resonating filter;

diagnose the under-fueling failure mode in response to the average satisfying a predetermined criterion and the exhaust oxygen signal satisfying a first predetermined criterion; and diagnose the under-fueling failure mode in response to the average satisfying the predetermined criterion and the exhaust oxygen signal satisfying a second criterion differing from the first criterion.

17. The electronic controller apparatus of claim 16, wherein:

the first predetermined criterion comprises the exhaust oxygen signal being below a first predetermined threshold, and the second predetermined criterion comprises the exhaust oxygen signal being above a second predetermined threshold.

18. The electronic controller apparatus of claim 17, wherein the first predetermined threshold and the second predetermined threshold are determined for stoichiometric fuel combustion.

19. The electronic controller apparatus of claim 15, wherein the non-transitory memory medium is configured with instructions executable by the processor to:

process the pressure signal with a plurality of resonating filters configured to resonate in response to a plurality of different injector failure modes; and differentially diagnose one of the plurality of different injector failure modes in response to output of one or more of the plurality of resonating filters.

20. The electronic controller apparatus of claim 19, wherein the electronic controller apparatus distinguishes between an under fueling condition of a first injector and an over-fueling condition of a second injector adjacent the first injector in firing order in response to the exhaust oxygen signal.

* * * * *